United States Patent
Kleinhans et al.

[11] Patent Number: 5,452,610
[45] Date of Patent: Sep. 26, 1995

[54] MASS-FLOW SENSOR

[75] Inventors: Josef Kleinhans, Vaihingen; Uwe Konzelmann, Asperg; Eckart Reihlen, Reutlingen; Botho Ziegenbein, Reutlingen; Jiri Marek, Reutlingen; Frank Bantien, Ditzingen; Guenther Findler, Stuttgart; Michael Offenberg, Tuebingen, all of Germany

[73] Assignee: Robert Bosch GmbH, Stuttgart, Germany

[21] Appl. No.: 202,402

[22] Filed: Feb. 25, 1994

[30] Foreign Application Priority Data

Feb. 25, 1993 [DE] Germany ............... 43 05 797
Nov. 13, 1993 [DE] Germany ............. 43 38 891.4

[51] Int. Cl.⁶ .................................... G01F 1/68
[52] U.S. Cl. .................... 73/204.26; 73/204.25
[58] Field of Search ............ 73/204.23, 204.25, 73/204.26

[56] References Cited

U.S. PATENT DOCUMENTS

| | | | |
|---|---|---|---|
| 4,320,655 | 5/1982 | Kammermaier et al. | 73/204.26 |
| 4,498,337 | 2/1985 | Grunner | 73/204.26 |
| 4,501,144 | 2/1985 | Higashi et al. | |
| 4,633,578 | 1/1987 | Aine et al. | 73/204.23 |
| 4,696,188 | 9/1987 | Higashi | 73/204.26 |
| 5,108,198 | 4/1992 | Furubayashi | |

FOREIGN PATENT DOCUMENTS

4003473A1 8/1991 Germany.
4106287A1 4/1992 Germany.

Primary Examiner—Richard E. Chilcot, Jr.
Assistant Examiner—William L. Oen
Attorney, Agent, or Firm—Kenyon & Kenyon

[57] ABSTRACT

A mass-flow sensor includes a measuring element on a membrane and a media-temperature measuring element on a separate membrane. By configuring the media-temperature measuring element on a membrane, the mass-flow sensor quickly reacts to changes in the temperature of the flowing medium.

12 Claims, 8 Drawing Sheets

MASS-FLOW SENSOR

BACKGROUND OF THE INVENTION

The present invention is related to a mass-flow sensor arranged on a membrane. Fluid flows past this arrangement. In particular, the measuring element exhibits a higher temperature than the medium. The measuring element measures the intensity of the flow of the medium based on the transfer of heat into the medium.

U.S. Pat. No. 4,501,144 discusses a mass-flow sensor in which a measuring element is arranged on a membrane, and a medium flows past the membrane. The measuring element exhibits a higher temperature than the medium, and the intensity of the flow of the medium is measured from the transfer of heat into the medium. In addition, a media-temperature measuring element is mounted on a frame that retains the membrane. The temperature of the measuring element is kept at a constant level in relation to the temperature of the media-temperature measuring element. Furthermore, U.S. Pat. No. 4,501,144 discusses suspending the thin membrane in a frame of monocrystalline silicon.

German Published Patent Application No. 41 06 287 discusses methods for etching recesses into silicon plates having a 100-orientation. These recesses can be used to produce silicon frames, in which a membrane is suspended.

German Unexamined Patent Application No. 40 03 473 describes a method for manufacturing motion sensors, in which a recess is etched into a silicon wafer having 110-orientation. This etching process can also be used to produce a silicon frame in which a membrane is suspended.

SUMMARY OF THE INVENTION

In the mass-flow sensor of the present invention, the output signal from the mass-flow sensor is quickly adapted to changes in the temperature of the medium to be measured. In this manner, faulty measurements which can result due to sudden changes in the temperature of the medium are reliably suppressed. Hence, the sensor of the present invention is especially well suited for applications in sectors that are problematic for other, slower sensors, such as measuring an air mass inducted by an engine in a motor vehicle. The method of the present invention enables the production of mass-flow sensors which react quickly to changes in the temperature of the medium to be measured, with especially simple means.

The present invention obtains especially rugged, easily producible sensors by suspending the membrane in a frame of monocrystalline silicon. In the present invention, an isothermal element is arranged between the measuring element and the media-temperature measuring elements to suppress the heating of the media-temperature measuring element. This isothermal element may include a metallic bar, a slit, or a silicon bar not as thick as the frame. Furthermore, the isothermal element can be a silicon bar having the same thickness as the silicon plate, in which case a recess is then assigned to each membrane. The recesses for the membrane can thereby form a rectangle, a hexagon, or a parallelogram on the bottom side of the silicon plate. A hexagon or parallelogram form reduces the surface area used to produce the mass-flow sensors.

In the present invention, connections and printed conductors are arranged on the silicon frame to allow the measuring element and the media-temperature measuring element to be contacted simply. In the present invention, the connections for the measuring element and the media-temperature measuring element are both arranged on the same side of the silicon plate in relation to the media current to permit the mass-flow sensor to be simply installed in a housing.

An isothermal element including a silicon bar is produced quite simply in accordance with the present invention by introducing doping material into the top side of the silicon plate before producing the membrane layer. The doping and the etching process are selected to ensure that the doped silicon is not etched during the etching process. In an alternative method for producing an isothermal element of silicon in accordance with the present invention, an etching projection is used during the etching process to dispense with an additional doping on the top side of the silicon plate. Arrangements of triangles, hexagons or parallelograms can be used for etching two recesses into the bottom side of the silicon plate.

BRIEF DESCRIPTION OF THE DRAWINGS

FIG. 11 illustrates a cross-section, FIG. 12 illustrates a top view.

FIG. 15 illustrates a cross-section.

DETAILED DESCRIPTION

Figure 1:
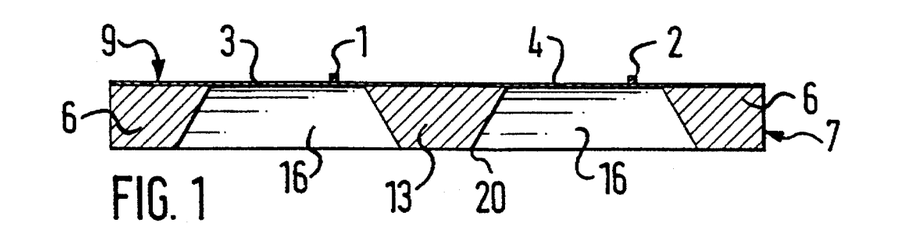
FIG. 1 illustrates a cross-section through a mass-flow sensor according to the present invention.
Figure 2:
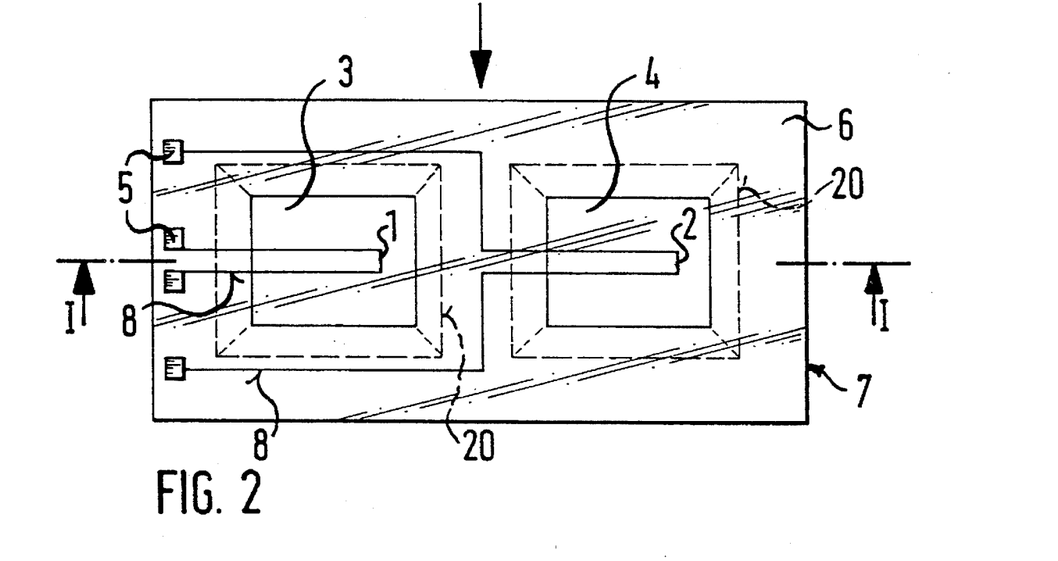
FIG. 2 illustrates a top view of the mass-flow sensor according to FIG. 1.

FIG. 1 illustrates a cross-section of a mass-flow sensor according to the present invention while FIG. 2 illustrates a top view. In this case, a measuring element 1 is mounted on a membrane 3, and a media-temperature measuring element 2 on a membrane 4. The two membranes 3, 4 are suspended in a frame 6 of monocrystalline silicon. An isothermal element is situated as a silicon bar 13 between the two membranes 3, 4.

The mass-flow sensor is produced from a silicon plate 7 by introducing the two recesses 16 into the under side of the silicon plate 7. The recesses 16 extend up to a membrane layer 9, which is deposited on the top side of the silicon plate 7. Connection surfaces 5 are situated on the frame 6. The measuring element 1 and the media-temperature measuring element 2 can be contacted through the connection surfaces 5 by means of printed conductors 8. An electrical contact can be established to other circuits (not shown here) via the connection surfaces 5.

The arrow indicates a mass flow, for example an air flow, which passes a surface of the mass-flow sensor. The measuring element 1 is heated by an electrical current, which is applied through the connection surfaces 5 and the printed conductors 8. In addition, the electrical resistance of the measuring element 1 is measured. The measuring element 1 is designed so that the resistance changes with changes in its temperature.

The measuring element 1 is cooled by the medium flowing past it. The extent of this cooling depends, in this case, on the mass flow of the medium flowing past. When the heating current of the measuring element 1 is kept at a constant level, the strength of the flow rate of the medium flowing past the measuring device 1 can be determined by measuring the resistance of the measuring element 1.

This measuring element 1 represents only one possible form of such a mass-flow sensor. It is also possible to mount a separate heating element and a temperature-measuring element on the membrane 3 or, as indicated in the U.S. Pat. No. 4,501,144, to provide a heating element with two or more measuring elements. The principle underlying all these mass-flow sensors is that the quantity of heat dissipated from the measuring element by the medium flowing past depends on the mass of the medium flowing past it.

Further, a change in the signal from the measuring element is also associated with a change in the temperature of the medium flowing past. All mass-flow sensors, which have a measuring element that utilizes the transfer of heat into the medium flowing past in addition, therefore, have a media-temperature sensing element 2. This media-temperature sensing element 2 is used to suppress the influence of the temperature of the medium on the flow measuring signal. As a rule, this suppression is achieved by assuming that the measuring element 1 has a constant overtemperature, i.e., the temperature of the measuring element 1 is always increased relative to the temperature of the medium by a definite, constant amount. However, the overtemperature of the measuring element 1 can just as well vary in relation to the media temperature, in which case then the measured value of the media-temperature measuring element 2 is then utilized to correct the measured value of the measuring element 1.

In this case, as indicated, for example, in the U.S. Pat. No. 4,501,144, the media-temperature measuring elements are mounted on the frame. The disadvantage of configuring the media-temperature measuring element 2 on the frame, however, is that the media-temperature measuring element 2 reacts only relatively slowly to changes in the temperature of the medium. For special applications, for example for use in motor vehicles, the response time of the media-temperature sensing element 2 becomes particularly critical. For example, when a motor vehicle is driven out of a heated garage in a cold season, crude, faulty measurements of the inducted air flow can result over the short term due to the large and rapid change in air temperature when slowly responding mass-flow and media-temperature sensors are used. Another example is, for instance, a motor vehicle having an engine that has warmed up to a high level and is abruptly brought to a stop at a traffic light, for example. In such a case, the air in the intake manifold heats up almost instantaneously to the high ambient temperature of the engine. This likewise leads to a short term faulty measurement of the mass flow if the mass-flow sensor does not react quickly enough to the change in the temperature of the air.

The reaction time of the media-temperature measuring element 2 of the present invention is especially short since the media-temperature measuring element 2 is arranged on the thin membrane 4. The membrane 4 is heated or cooled quite quickly by the medium flowing over it due to its small mass. Consequently, the media-temperature measuring element 2 is heated or cooled just as quickly. Both membranes 3, 4 are designed to thermally decouple (to the best extent possible) the measuring element 1 or the media temperature measuring element 2 from the frame 6 and to thermally coupled (to the best extent possible) the measuring element 1 or the media-temperature measuring element 2 to the media flow.

As a result of the thermal decoupling from the frame 6 and the good thermal coupling to the media flow, both the measuring element 1 and the media-temperature measuring element 2 react quite quickly. Since, the membranes 3, 4 in the device of the present invention are especially thin (in the magnitude of 1 micrometer) and, furthermore, since the membranes 3, 4 consist of a material having low thermal conductivity and a low specific thermal heat-absorption capacity, the measuring element 1 and the media-temperature measuring element 2 are thermally decoupled from the frame 6 but are thermally coupled to the media flow. Thin membranes of silicon oxide or silicon nitride may be employed as the membranes 3, 4. Such thin membranes of silicon oxide or silicon nitride can be produced quite simply on the surface of silicon plates 7. The principle demonstrated here of a good thermal coupling of the measuring element 1 and of the media-temperature measuring element 2 to the medium flowing past can also be applied, however, to other membrane materials.

Separating the fact that the measuring element 1 and the media-temperature measuring element 2 by an isothermal element, in this case a silicon bar 13, is also an important aspect of the present invention. If the measuring element 1 and the media-temperature measuring element 2 were arranged on a single membrane, then the media-temperature measuring element 2 would be heated along with the measuring element 1 that has to be heated to an "overtemperature" as discussed above. In such a case, the media-temperature measuring element 2 would no longer measure the temperature of the medium, but rather, it would measure an intermediate value between the media temperature and the temperature of the measuring element 1.

In FIGS. 1 and 2, the edges of the recesses 16 are denoted on the bottom side of the silicon plate 7 by 20. As illustrated in the top view of FIG. 2, the surface which lies inside the edges 20 of the recesses 16 is substantially larger than the surface required for membranes 3, 4. The recesses 16 are anisotripically etched into the silicon plate 7. The silicon plate 7 has a 100-surface on its top side and the bottom side. Recesses 16 having a rectangular form when viewed from the top can be introduced into such 100-oriented silicon plates 7 by using etching solutions, which etch the 111-crystal planes quite slowly. Such etching processes are described, for example, in German Unexamined Patent Application No. 41 06 287.

In FIG. 2, both membranes 3, 4 are arranged side by side in relation to the direction of flow of the medium. Since the connection surface 5 are only arranged on one side of the silicon plate 7, when the mass-flow sensor 1 is installed in a housing, the connection surfaces 5 are contacted exclusively from one side. Therefore, this configuration of the connection surfaces 5 is quite favorable for installing the mass-flow sensor in a housing.

Figure 3:
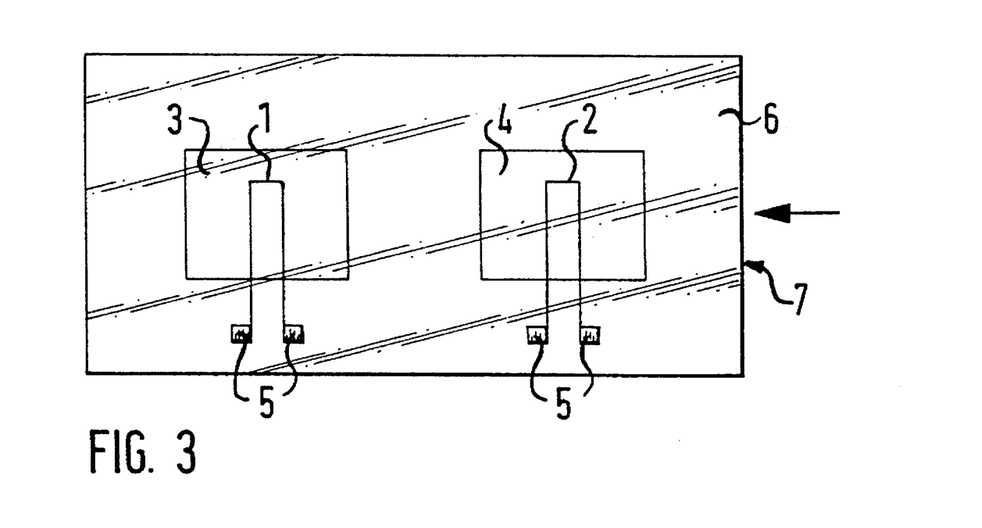
FIG. 3 illustrates a top view of another exemplified embodiment of a mass-flow sensor according to the present invention.

FIG. 3 illustrates another arrangement of the membranes 3, 4 in which the membranes are configured to lie one behind the other in relation to the media flow. In such a front-to-back arrangement, the media-temperature measuring element 2 is situated upstream from the measuring element 1 to prevent the media-temperature measuring element 2 from being influenced by the measuring element 1 as a result of the media flow being heated by the measuring element 1. The connection surfaces 5 are arranged, next to the membranes 3, 4, relative to the direction of flow of the medium, on the frame 6. Configuring the connection surfaces 5 next to the membranes 3, 4 allows the connection surfaces 5 to be covered without disturbing the flow of the medium. Small elevations arranged on the surface cause vortices in the regions situated downstream from the direction of flow and, thus, to non-reproducible flow states. The connection surfaces 5, to which wires or the like are secured, should therefore be arranged to the side of the measuring element 1 or the media-temperature measuring element 2, in relation to the direction of flow, to contact the measuring element 1, or rather the media-temperature measuring element 2.

Figure 4A:
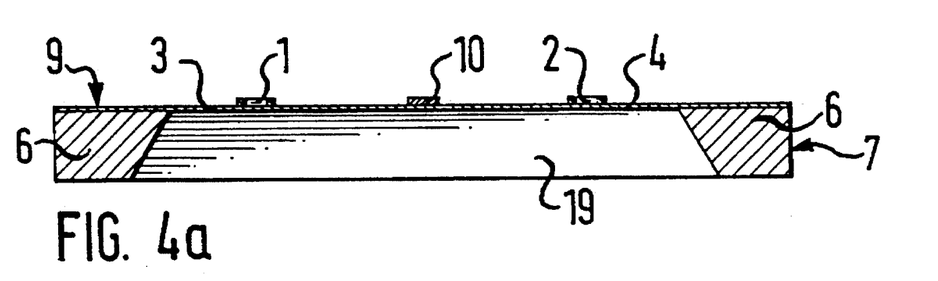
FIG. 4a illustrates a cross-section, and FIG. 4b a top view, of another mass-flow sensor in accordance with the present invention.
Figure 4B:
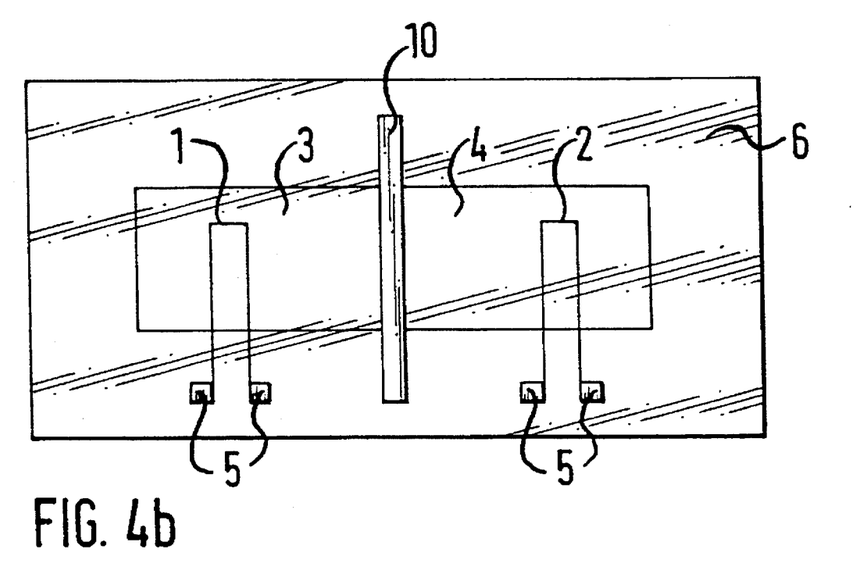

FIG. 4a illustrates a cross-section, and FIG. 4b illustrates a top view, of another exemplified embodiment of the mass-flow sensor according to the present invention. Two membranes 3, 4 are clamped in a frame 6. A measuring element 1 is situated on the membrane 3 and a media-temperature measuring element 2 is situated on the membrane 4. The two membranes 3, 4 are separated by an isothermal element such as a metallic bar 10. Other materials having good thermal conduction, such as polysilicon can also be used. The mass-flow sensor is again structured out of a silicon plate 7 having a 100-orientation by producing a membrane layer 9 on the top side of the silicon plate 7 and by placing structures for the measuring element 1 and the media-temperature measuring element 2 on the membrane layer 9. The recess 19 is anisotropically etched in the silicon plate 7, starting from the rear side. Furthermore, a structure for the metallic bar 10 is produced on the membrane layer 9 on the top side of the silicon plate 7.

The metallic bar 10 serves as an isothermal element, i.e., it serves to stop a substantial flow of heat from the measuring element 1 to the media-temperature measuring element 2. Since both membranes 3, 4 are again made of a dielectric material having low thermal conductivity and thermal capacity, the flow of heat through the membrane 3 from the measuring element 1 does not significantly heat the metallic bar 10, which is in thermal contact with the frame 6. What is important in this connection is that metals, as a rule, have a very high thermal capacity and thermal conductivity. Thus, the temperature of the metallic bar 10 always approximates that of the silicon frame 6.

Figure 5:
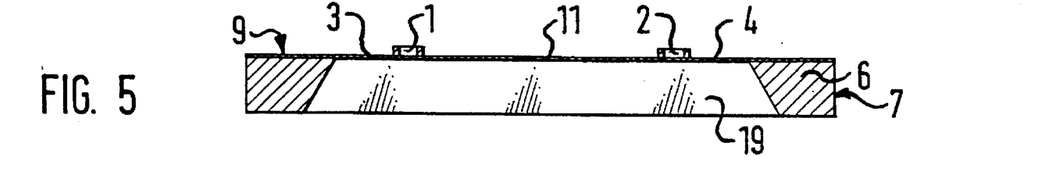
FIGS. 5 and 6 depict cross-sections through other exemplified embodiments of mass-flow sensors of the present invention.

FIG. 5 illustrates the cross-section through another exemplified embodiment of the mass-flow sensor according to the present invention. Two membranes 3, 4 are fixed in a frame 6 of monocrystalline silicon, a measuring element 1 being situated on the membrane 3 and a media-temperature measuring element 2 being situated on the membrane 4. A slit 11 is arranged as an isothermal element between the two membranes 3, 4. A top view of the mass-flow sensor according to FIG. 5 corresponds essentially to the top view shown in FIG. 4b, except that the metallic bar 10 is replaced by the slit 11. The mass-flow sensor according to FIG. 5 is manufactured similarly to the mass-flow sensor according to FIG. 4a and b. A membrane layer and structures for the measuring element and the media-temperature measuring element 2 are again produced on a silicon plate 7. The frame 6 is etched out of the silicon plate 7 by introducing the recess 19. The slit 11 can be introduced before or after the recess 19 is etched.

The slit 11 serves again as an isothermal element, i.e., it suppresses a flow of heat from the measuring element 1 to the media-temperature measuring element 2. On the one hand, the thermal conductivity of the slit 11 is very low. On the other hand, the medium in the slit 11 is permanently replaced by the flow, so that the slit 11 always has the temperature of the medium. The slit 11 can be structured in the membrane layer 9 before or after the recess 19 is etched.

Figure 6:
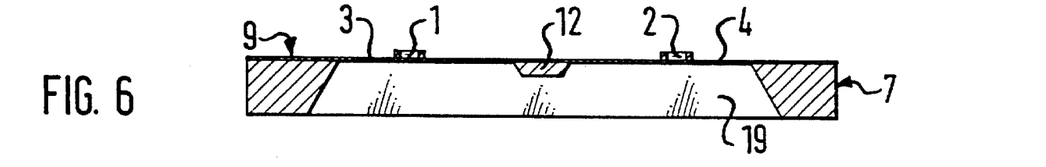

FIG. 6 depicts another exemplified embodiment of the mass-flow sensor of the present invention, which, except for a refinement of the isothermal element, corresponds to the exemplified embodiments of FIGS. 4a, 4b, and 5. A silicon bar 12 is arranged as an isothermal element between the two membranes 3, 4. The silicon bar 12 is arranged beneath the membrane layer 9 and is connected to the frame 6. As a result of this connection, the silicon bar 12 has a temperature near that of the frame 6 since the thermal conductivity of silicon is very high.

The mass-flow sensor according to FIG. 6 with the silicon bar 12 can be manufactured by various methods. In one method of manufacturing, dopants can be introduced to the top side of the silicon plate 7 before the membrane layer 9 is manufactured, the geometric shape of the doped silicon corresponding in this case to the geometric shape of the silicon bar 12. The dopants and the etching process for the recess 19 are selected to ensure that the doped silicon is not etched when the recess 19 is formed. This can be achieved, for example, by providing the silicon plate 7 with a p-doping and the silicon bar 12 with a heavy $p^+$-doping, and by etching the recess 19 with an alkaline etching solution.

Another possibility consists in p-doping the silicon plate 7 and n-doping the silicon bar 12. An electric voltage is applied between the n-doped bar 12 and the p-doped substrate 7 when the recess 19 is etched with an alkaline etching solution. This voltage protects the bar 12 from being attacked by the etching solution.

Another method for manufacturing an isothermal element as a silicon bar 12 in accordance with the embodiment of the present invention illustrated in FIG. 6, in which the silicon bar 12 has the same doping as the silicon plate 7, is described in FIGS. 7 through 10.

Figure 7:
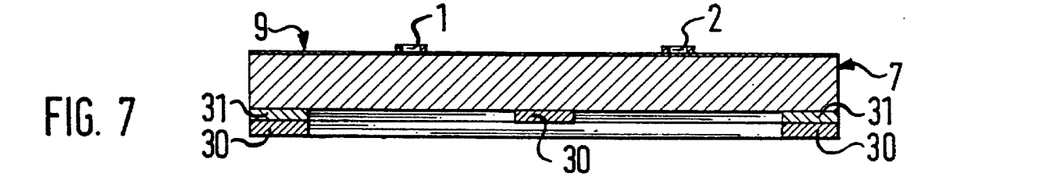
FIGS. 7 through 10 illustrate a method for producing the mass-flow sensors shown in FIG. 6.

FIG. 7 illustrates a silicon plate 7, having a top surface on which a membrane layer 9 is manufactured. The membrane layer 9 consists preferably of silicon nitride or of silicon oxide. A measuring element 1 and a media-temperature measuring element 2 are applied to the membrane layer 9. Two etching masks 30, 31, which partially overlap one another, are applied to the bottom side of the silicon plate 7. The area of the silicon plate 7, from which the frame is to be structured, is covered by both etching masks 30, 31. The area of the silicon plate 7, from which the bar 12 is to be structured is only covered by the one etching mask 30. The etching mask 30 can be removed independently of the etching mask 31. Both the etching mask 30 and the etching mask 31 can consist of silicon oxide, for example.

Figure 8:
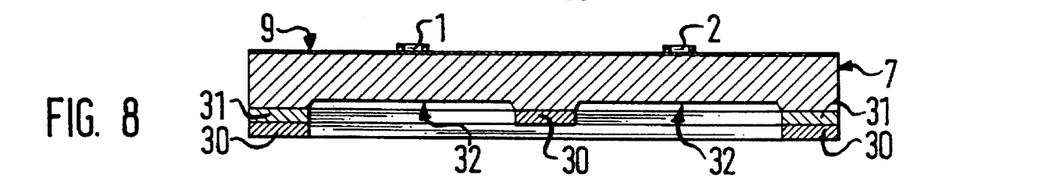
Figure 9:
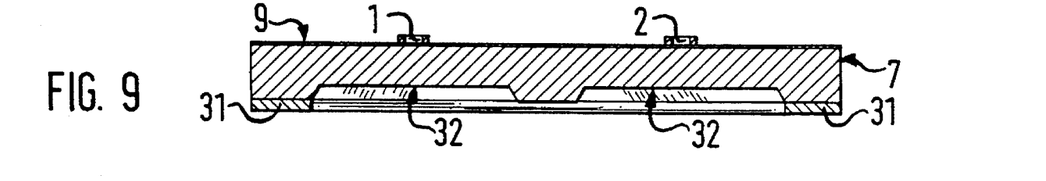

When the silicon plate 7 with the two etching masks 30, 31 is dipped into an etching solution, which etches the silicon oxide, then the etching mask 30 is initially removed (see FIG. 9). Only after that, when the etching mask 31 is exposed, is the etching mask 31 attacked. By arranging the etching masks 30 and 31 partially overlapping, regions of the silicon plate 7 are initially covered with an etching mask during an etching process and are no longer covered with an etching mask in the further course of the etching process. How this multilayered etching mask is used to structure the silicon plate 7 will be described with reference to the additional FIGS. 8 through 10. In addition, the etching masks 30, 31 may consist of other materials, which can be selectively etched in relation to one other. For example, the etching mask 31 could consist of silicon oxide and the etching mask 30 of silicon nitride.

In FIG. 8, a first etching step is shown for treating the silicon plate 7. In this first etching step, the bottom side of the silicon plate 7 is exposed for a limited time to an alkaline etching solution. As a result, the recesses 32 are etched into the under side of the silicon plate 7. The bottom of the recesses 32 is formed by a 100-plane of the silicon monocrystal, as is the top surface of the silicon plate 7. Since the edges of the etching masks 30 and 31 are each situated on a 111-crystal plane and each form an angle of 54.74° with the top surface of the silicon plate 7, the side walls of the recesses 32, which form an etching projection, are made up of 111-crystal planes.

In FIG. 9, the first etching mask 30 is removed from the under side of the silicon plate 7. The regions of the silicon plate 7 from which the frame 6 is to be structured are protected from an attack by an etching solution, by the etching mask 31. Between the recesses 32, the region of the silicon plate 7 from which the silicon bar 12 is to be structured is no longer protected from attack by an etching solution. The base area of this region is formed by a 100-plane of the silicon monocrystal. In the same way, the bottom of the recesses 32 is formed by a 100-plane of the silicon monocrystal. If the silicon plate 7, as shown in FIG. 9, continues to be attacked on its under side by an etching solution that removes silicon, then the recesses 32 and the middle region of the silicon plate 7, out of which the silicon bar 12 is structured, are etched down with the same speed. The etching projection of the recesses 32 is thereby retained.

Figure 10:
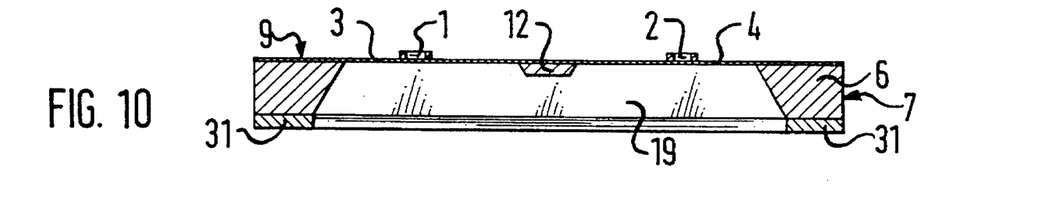

FIG. 10 depicts the silicon plate 7 of FIG. 9 after the etching process continues further in a second etching step and when it is stopped, exactly at the time the etching projection 32 reached the membrane layer 9. At this instant, the silicon plate 7 is completely etched to the membrane layer 9 in those regions which have an etching projection 32 in FIG. 9. However the silicon bar 12, which in FIG. 8 was still covered by the first etching mask 30, is not yet completely etched away. In the structure of FIG. 10 were further etched, then the thickness of the silicon bar 12 would be further diminished until the bar 12 would disappear and etching would no longer occur. Except for the etching mask 31 remaining on the under side of the silicon plate 7, the structure of FIG. 10 corresponds to the mass-flow sensor as shown in FIG. 6.

Figure 11:
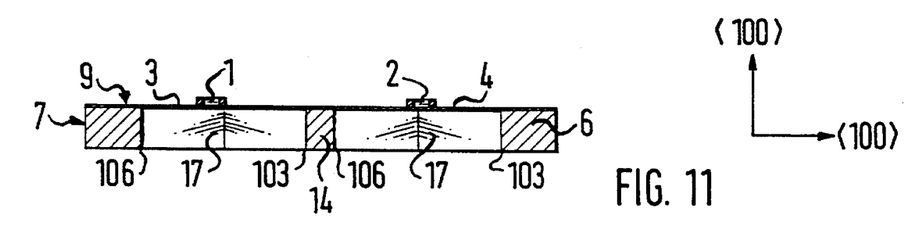
Figure 12:
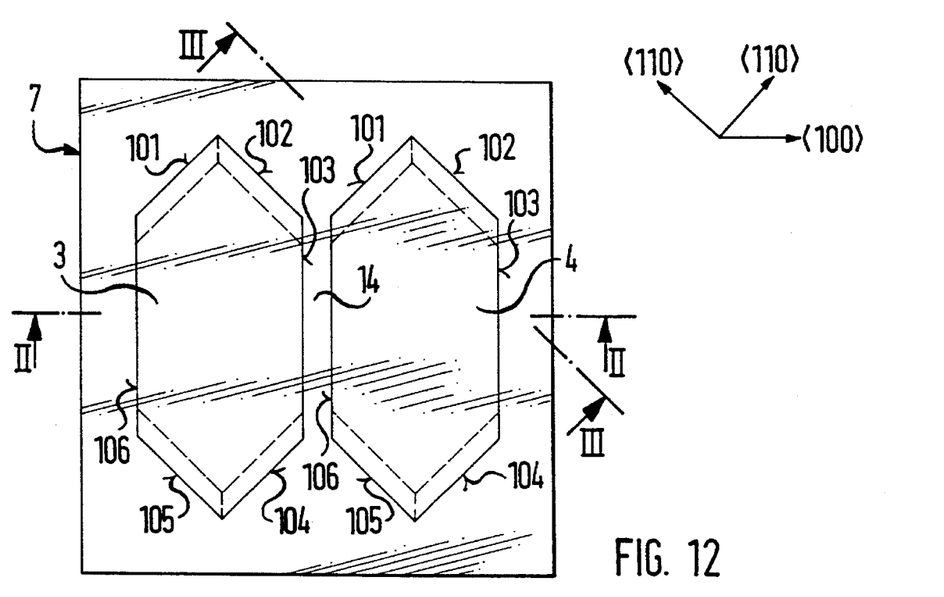

Another exemplified embodiment of the mass-flow sensor according to the present invention is illustrated, in cross-section in FIG. 11. FIG. 12 depicts a bottom view of the mass-flow sensor according to FIG. 11. Another cross-section through the mass-flow sensor of FIGS. 11 and 12 is illustrated in FIG. 13.

FIG. 11 depicts a silicon plate 7 having an applied membrane layer 9. Recesses 17 are introduced to the silicon plate 7 starting from the under side. A frame 6, in which two membranes 3, 4 are clamped, is formed from the silicon plate 7 by the recesses 17. Situated between the two membranes 3, 4, is an isothermal element, shown here as a silicon bar 14 having the thickness of the silicon plate 7. A measuring element 1 is situated on the membrane 3, and a media-temperature measuring element 2 is situated on the membrane 4. For the sake of simplicity, the measuring element 1 and the media-temperature measuring element 2 are not shown in FIGS. 12 and 13.

The geometric shape of the recesses 17 is illustrated by the bottom view of the silicon plate 7 in FIG. 12. On the bottom side of the silicon plate 7, the edges 101 through 106 of the recesses 17 define a hexagon shape, the first edge 101 forming an angle of 90° with the second edge 102, the second edge 102 forming an angle of 135° with the third edge 103, the third edge 103 forming an angle of 135° with the fourth edge 104, the fourth edge 104 forming an angle of 90° with the fifth edge 105, the fifth edge forming an angle of 135° with the sixth edge 106, and the sixth edge 106 forming an angle of 135° with the first edge 101. Accordingly, the membranes 3, 4 likewise form a hexagon shape. However, the longitudinal proportions among the individual sides are different than those of the edges 101 through 106 of the recesses 17. Furthermore, the line of intersection II—II is drawn in FIG. 12, along which FIG. 11 shows the cross-section through the mass-flow sensor.

Figure 13:
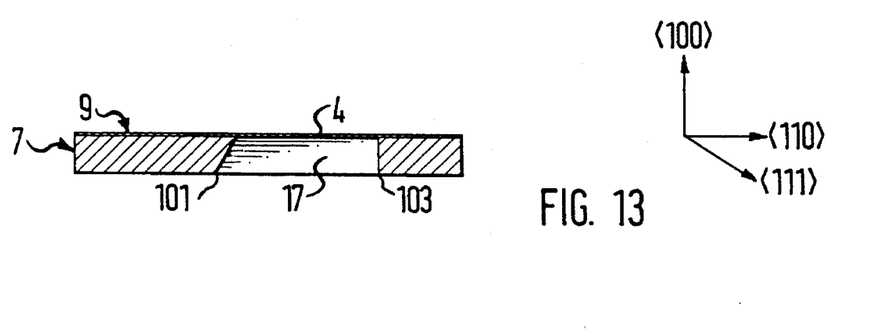
FIG. 13 illustrates another cross-section, through a mass-flow sensor of the present invention.

FIG. 13 illustrates the mass-flow sensor intersected along line III—III of FIG. 12. FIG. 13 depicts a section through the membrane 4 with the corresponding recesses 17 of the silicon plate 7.

As illustrated in FIGS. 11 and 13, the top surface of the silicon plate 7 has a 100-orientation. As FIG. 11 reveals, two edges 103, 106 each of the recesses 17 are situated on one 100-plane each of the silicon monocrystal of the silicon plate 7. They form an angle of 90° with the 100-top surface of the silicon plate 7. The side walls of the recesses 17 extend from these edges 103, 106 perpendicularly up to the membrane layer 9, or rather to the membranes 3, 4. Four edges 101, 102, 104, 105 of the recesses 17 are each situated in a 111-direction of the silicon monocrystal of the silicon plate 7, these Ill-crystal planes forming an angle of approx. 54.74° with the 100-top surface of the silicon monocrystal of the silicon plate 7. Correspondingly, the side walls of the recesses 17, which meet these edges 101, 102, 104, 105, form an angle of 54.74° with the 100-top surface of the silicon plate 7 and, consequently, also with the membrane layer 9, or rather the membranes 3, 4. The cross-section in FIG. 11 depicts the side walls 103, 106 of the recesses 17, which form a right angle with the membrane layer 9. The cross-section in FIG. 13 depicts a side wall 101 of a recess 17, which forms an angle of 54.74° with the membrane layer and a side wall 103, which forms a right angle with the membrane layer 9.

The functioning of the mass-flow sensor according to FIGS. 11 through 12 is similar to that of the mass-flow sensors of FIGS. 1 through 6. In this case, the silicon bar 14 forms the isothermal element which prevents a flow of heat from the membrane 3 of the measuring element 1 to membrane 4 of the media-temperature measuring element 2. The silicon bar 14 has the same thickness as the silicon plate 7 and is integrally formed with the frame 6. The excellent thermal conductivity of silicon and the large thickness of the bar 14 ensure that the bar 14 always has the same temperature as the frame 6.

Figure 14:
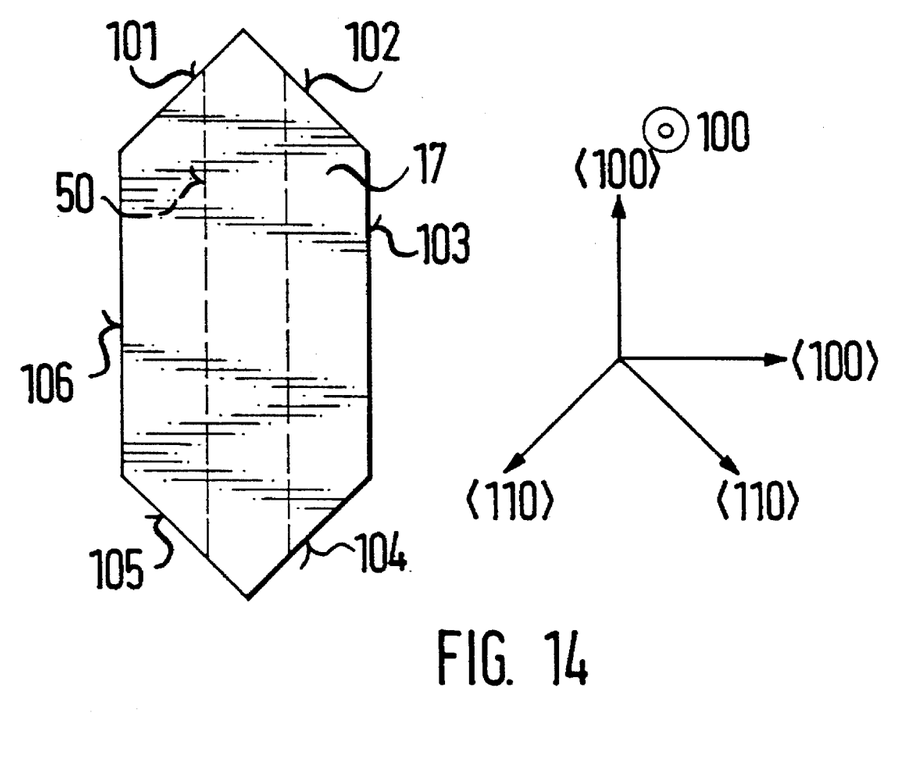
FIG. 14 illustrates the manufacturing of the membranes of FIG. 12.

FIG. 14 illustrates how the recesses 17 of FIGS. 11 through 13 are etched into the silicon plate 7. This etching process is discussed in the German Unexamined Patent Application No. 41 06 287. FIG. 14 depicts a hexagon-shaped etching mask 50, which is used for etching the recesses 17 with the edges 101 through 106. In addition, the alignment of the etching mask 50, or rather, of the edges 101 through 106 to the silicon monocrystal is shown. The region laying within the etching mask 50 represents the region of the silicon not covered by the etching mask 50. This region is formed by a 100-crystal surface of the silicon monocrystal and is etched down by the etching solution, which, as a rule, is an alkaline etching solution, with a specific etching speed. The side walls of the etching mask 50, which run parallel to the edges 103 and 106 of the recesses 17, are undercut in this case with the same speed as the downward etching process. In this direction lie, namely, the 100-planes of the silicon monocrystal, as shown in FIG. 14.

The etching mask 50 is not undercut, or rather, only minimally undercut in directions running parallel to the edges 101, 102, 104, 105 of the recesses 17 since these edges are each situated on a 111-plane of the silicon monocrystal which can only be negligibly etched by alkaline etching solutions. In FIG. 14, the crystal planes are indicated by unit vectors on the crystal surfaces. Since the unit vectors of the 100-plane and of the 100-planes lie in the planes of the paper, they show the normalized length 1.

In the process for etching the recesses 17, the geometric dimensions of the recesses 17 are partially defined by the etch-halting effect of the 111-crystal planes and partially by the time duration of the etchings. If the etching of the recesses 17 is continued after the recesses 17 have reached the membrane layer 9, then the width of the silicon bar 14 is diminished, i.e., the width of the recesses 17 is enlarged in this direction. The present invention permits such etching processes with considerable precision, thus enabling the silicon bar 14 to be manufactured with a high degree of reproducibility.

Figure 15:
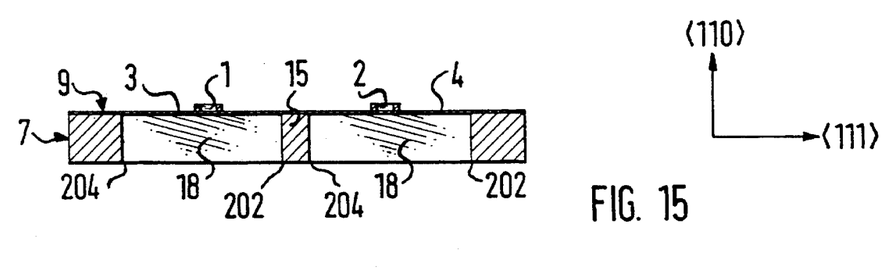
Figure 16:
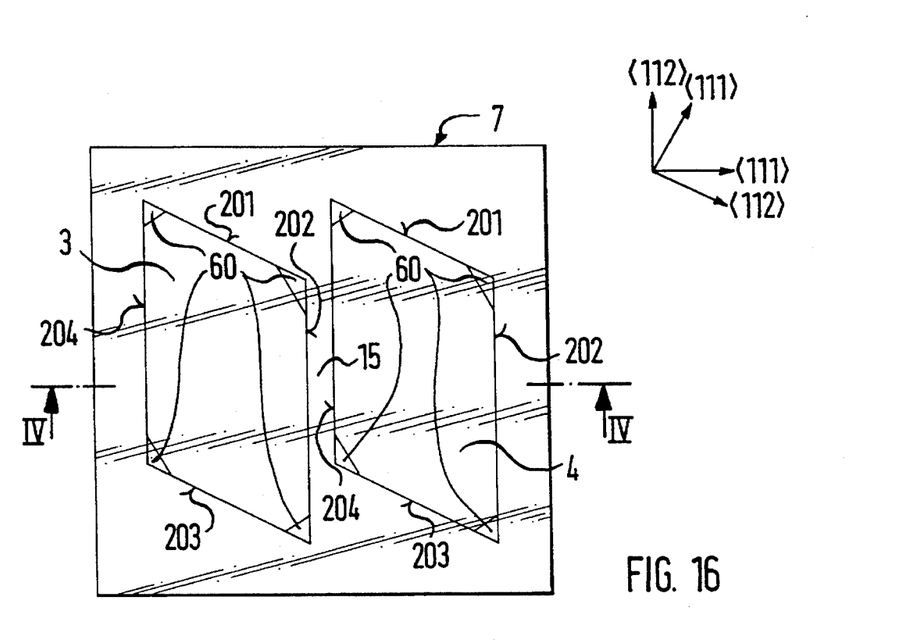
FIG. 16 illustrates a top view, of another exemplified embodiment of a mass-flow sensor.

Another exemplified embodiment of the mass-flow sensor according to the present invention is illustrates in FIGS. 15 and 16. FIG. 15 depicts a cross-section along line IV—IV of FIG. 16. FIG. 16 shows a bottom view of the mass-flow sensor shown in FIG. 15. FIG. 15 illustrates a silicon plate 7 having a membrane layer 9 applied to its top side and two recesses 18 introduced to its underside. The recesses 18 extend to the membrane layer 9 and, thus, form two membranes 3, 4. Arranged on the one membrane 3 is a measuring element 1 and, on the other membrane 4, a media-temperature measuring element 2. For the sake of simplicity, the measuring element 1 and the media-temperature measuring element 2 are not shown in FIG. 16. As FIG. 16 reveals, the edges 201 through 204 of the recesses 18 define a parallelogram on the bottom side of the silicon plate 7.

The first edge 201 forms an angle of approx. 109.5° with the second edge 202; the second edge 202 forms an angle of approx. 70.5° with the third edge 203; the third edge 203 forms an angle of approx. 109.5° with the fourth edge 204; and the fourth edge 204 forms an angle of approx. 70.5° with the first edge 201. As the cross-section of FIG. 15 reveals, the walls 202, 204 of the recesses 18 are oriented perpendicularly to the top surface of the silicon plate 7 (as are the walls 201, 203). The silicon plate 7 is a monocrystalline silicon plate, whose top surface is formed by a 110-plane of the silicon monocrystal. Oriented perpendicularly to this 110-top surface are 111-planes of the silicon crystal. The 111-planes are utilized for etching the recesses 18. The 111-crystal planes, which are perpendicular to the 110-top surface of the silicon plate 7, form an angle of 109.5° with one another (outer angle) or a 70.5° inner angle. By utilizing these 111-crystal planes, which run perpendicularly to the 110-top surface of the silicon plate 7, the recesses 18 having perpendicular side walls and a parallelogram-shaped outline can be etched into the silicon plate 7. German Unexamined Patent Application No. 40 03 473 also discusses etching such parallelogram-type recesses into the 110-oriented silicon plates. Other crystal walls 60, not at right angles to the 110-top surface of the silicon plate 7, form in the corners of the parallelogram-type recesses 18.

The mass-flow sensor shown in FIGS. 15 and 16 is manufactured in a manner similar to that described for FIGS. 1, 2 and 11 through 13. The etching mask for etching the recesses 18 is arranged on the underside of the silicon plate 7 to ensure that the region enclosed by the edges 201 through 204 is exposed to the etching solution. In this etching process, it is not critical if the etching time is prolonged, since when the recess 18 is ready-etched, exclusively 111-crystal planes lie open (i.e., unprotected), which are only negligibly etched. Therefore, the two recesses 18 can also be arranged quite close together, since the width of the isothermal structure that is designed as a silicon bar 15, can be produced very precisely using the etching mask.

The functioning of the mass-flow sensor shown here corresponds again to the previous descriptions of other mass-flow sensors.

The mass-flow sensors of FIGS. 1 through 16 are mass-produced through the parallel processing of a plurality of mass-flow sensors, which are arranged on silicon wafers. The described manufacturing processes are applied in parallel to a plurality of mass-flow sensors. The silicon wafers are not partitioned until the last manufacturing step where cuts are introduced into individual mass-flow sensors.

Figure 17:
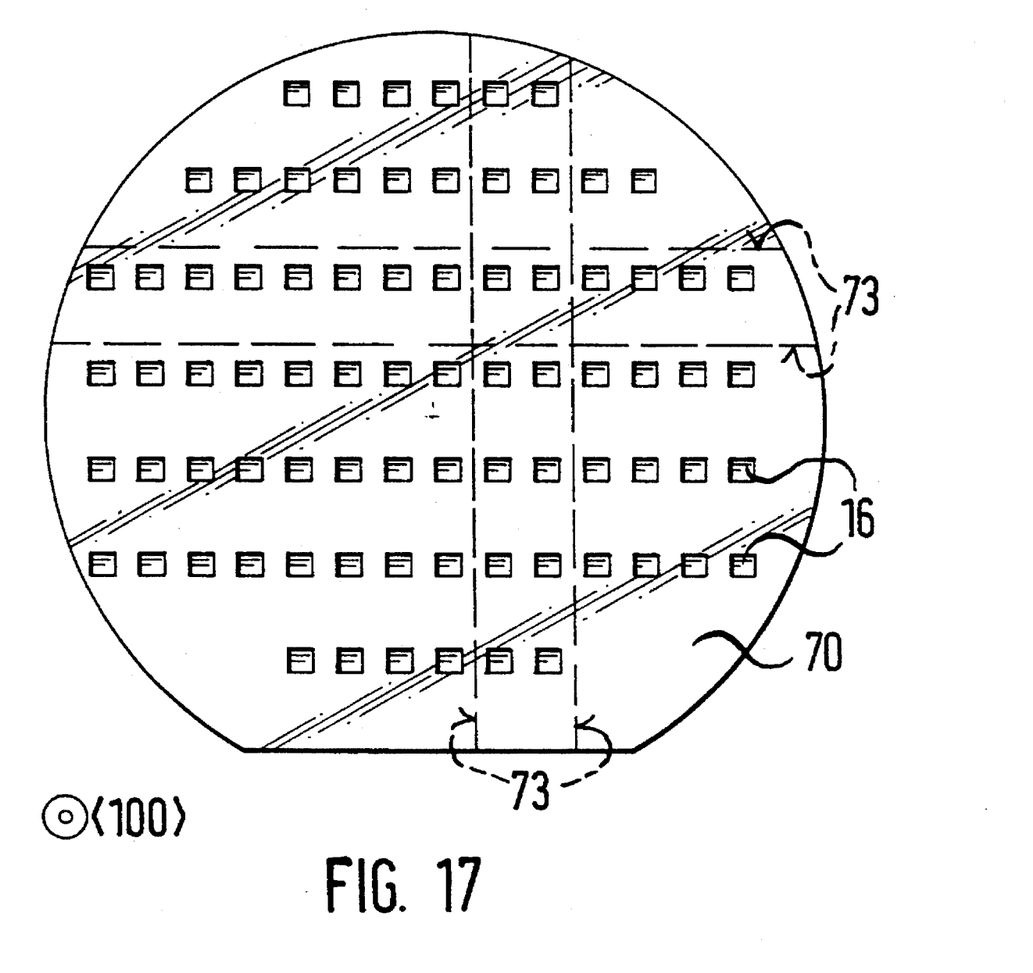
FIGS. 17 through 19 illustrates the configuration of various specific embodiments of mass-flow sensors on silicon wafers.
Figure 18:
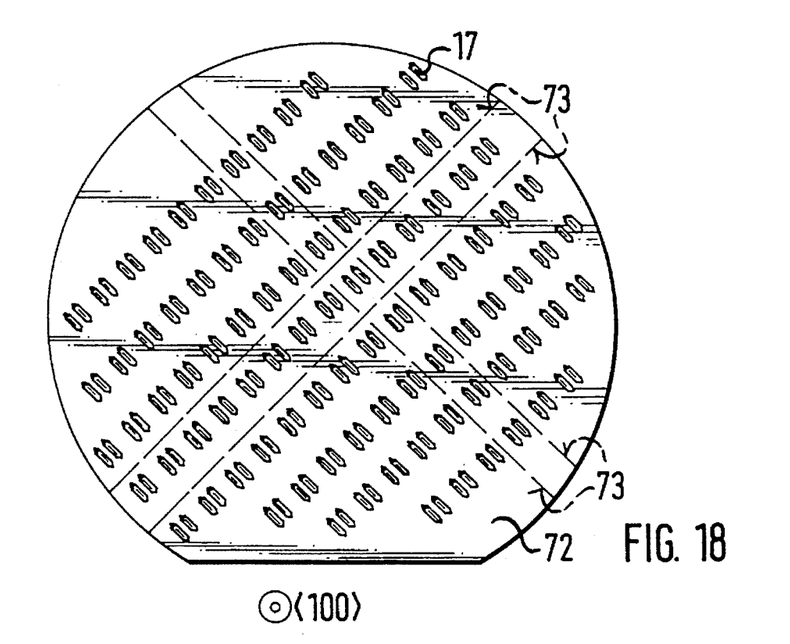
Figure 19:
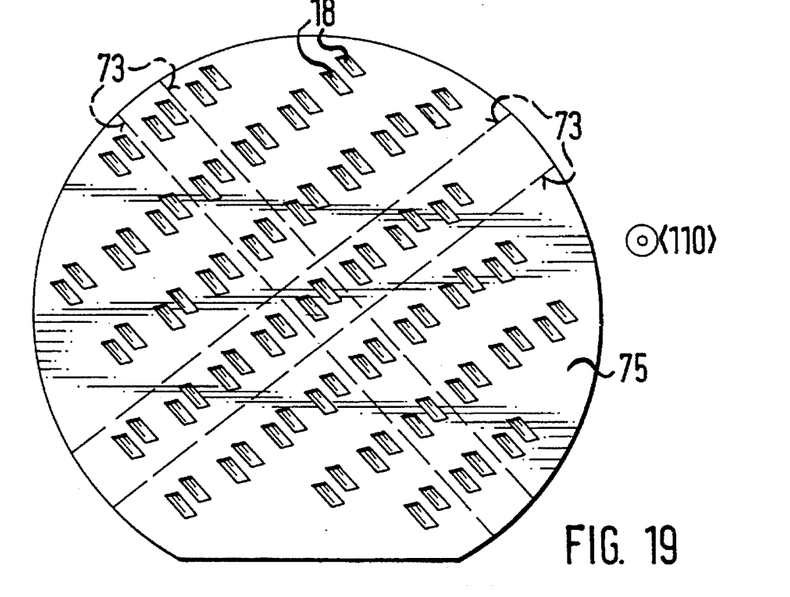

The various mass-flow sensors described in FIGS. 1 through 16 differ with respect to the surface required for their realization on the silicon wafers. Manufacturing processes which employ 100-oriented silicon plates have a greater surface requirement when the 111-crystal planes, which form an angle of 54.75° with the 100-top surface, are used in the etching of the recesses. This increased surface requirement for 100-oriented silicon may be diminished by also using the 100-crystal planes, which are at right angles to the 100-top surface of the silicon wafers, during the etching process, in addition to the 111-crystal planes that exhibit an angle of 54.74° with the 100-top surface. An example of this etching process is shown, for example, in FIGS. 11 through 14. While a slight asymmetry results in the mass flow sensors when 110-silicon wafers are used, the surface requirement is especially low due to the perpendicular etching walls. The slight asymmetry does not significantly disturb the functioning of the mass-flow sensors. FIGS. 17 through 19 show alignments of the various mass-flow sensors on silicon wafers.

FIG. 17 depicts a silicon wafer having a 100-oriented top surface. Mass-flow sensors are shown on this top surface, which are produced using the 111-crystal planes that form an angle of 54.74° with the top surface of the silicon wafer 70. In this case, if the mass-flow sensors of FIGS. 1 through 3 were formed, the view shown would be looking up from the bottom at the recesses 16. The mass-flow sensors of FIGS. 4 through 10, which likewise have the Ill-crystal planes that form an angle of 54.74° with the 100-surface, can be configured similarly for manufacturing on the silicon wafer 70. The silicon wafer 70 is diced into individual mass-flow sensors by introducing separating cuts 73. An example of separating cuts for a single mass-flow sensor is shown.

FIG. 18 depicts a silicon wafer 72 whose top surface is formed by a 100-crystal plane. Arranged on this silicon wafer 72 are mass-flow sensors. Both 111-crystal planes, which form an angle of 54.74° with the top surface of the wafer 72, as well as 100-crystal planes, which are at right angles to the surface of the wafer 72, have been used to manufacture these mass-flow sensors. The mass-flow sensors shown here correspond to the mass-flow sensors of FIGS. 11 through 14 a view from the bottom side of the recesses 17 shown here. The separating cuts 73, with which the individual mass-flow sensors are separated out of the silicon wafer 72, are shown by way of example for an individual mass-flow sensor. Due to the low surface requirement of the mass-flow sensors according to FIGS. 11 through 14, more mass-flow sensors can be arranged on the silicon wafer 72 than on the silicon wafer 70.

A silicon wafer 75, whose top surface is formed by a 110-crystal plane, is shown in FIG. 19. Mass-flow sensors according to FIGS. 15 and 16 are arranged on the silicon wafer 75. A view of the recesses 18 is shown from the bottom. Due to the minimal surface requirement of the mass-flow sensors according to FIGS. 15 and 16, more mass-flow sensors can be arranged on the wafer 75 than can on the wafer 70 of FIG. 17. Examples of separating cuts 73 required to separate off a mass-flow sensor are shown.

In addition to the exemplified embodiments introduced here, one skilled in the art could easily find other mass-flow sensors that would likewise utilize the principle of the present invention. For instance, an isothermal bar according to FIG. 4a or 6 can be combined with the membrane geometry of FIG. 16.

What is claimed is:

1. A mass-flow sensor for measuring flow of a medium comprising:
   a) a membrane;
   b) a measuring element arranged on said membrane, past which the medium flows, said measuring element having a higher temperature than the medium and measuring an intensity of the flow of the medium based on transfer of heat into the medium;
   c) a second membrane; and
   d) a media-temperature measuring element arranged on said second membrane, and measuring the temperature of the medium, at least one of the measurement of the medium flow is corrected and the temperature of the measuring element is altered depending on the temperature of the medium;
   e) a frame of monocrystalline silicon in which said first and second membranes are suspended, wherein said first and second membranes and said frame are formed from a silicon plate having a membrane layer on a top side, and having at least one recess in the bottom side of said silicon plate which extends up to said membrane layer; and
   f) an isothermal element arranged between said measuring element and said media-temperature measuring element, wherein said isothermal element is a bar on said membrane layer in an area above the at least one recess in the silicon plate on said top side of said silicon plate.

2. A mass-flow sensor for measuring flow of a medium comprising:
   a) a membrane;
   b) a measuring element arranged on said membrane, past which the medium flows, said measuring element having a higher temperature than the medium and measuring an intensity of the flow of the medium based on transfer of heat into the medium;
   c) a second membrane;
   d) a media-temperature measuring element arranged on said second membrane, and measuring the temperature of the medium, at least one of the measurement of the medium flow is corrected and the temperature of the measuring element is altered depending on the temperature of the medium;
   e) a frame of monocrystalline silicon in which said first and second membranes are suspended, wherein said first and second membranes and said frame are formed from a silicon plate having a membrane layer on a top side, and having at least one recess in the bottom side of said silicon plate which extends up to said membrane layer; and
   f) an isothermal element arranged between said measuring element and said media-temperature measuring element, wherein said silicon frame has a thickness and wherein said isothermal element is a silicon bar having a thickness less than said thickness of said silicon frame.

3. The mass-flow sensor of claim 2 wherein said silicon frame is doped and wherein said silicon bar has a different doping than said silicon frame.

4. The mass-flow sensor of claim 2 wherein said silicon frame is doped and wherein said silicon bar has the same doping as said silicon frame.

5. A mass-flow sensor for measuring flow of a medium comprising:
   a) a membrane;
   b) a measuring element arranged on said membrane, past which the medium flows, said measuring element having a higher temperature than the medium and measuring an intensity of the flow of the medium based on transfer of heat into the medium;
   c) a second membrane;
   d) a media-temperature measuring element arranged on said second membrane, and measuring the temperature of the medium, at least one of the measurement of the medium flow being corrected and the temperature of the measuring element being altered depending on the temperature of the medium;
   e) a frame of monocrystalline silicon in which said first and second membranes are suspended, wherein said first and second membranes and said frame are formed from a silicon plate having a membrane layer on a top side, and having at least one recess on a bottom side of said silicon plate which extends up to said membrane layer;
   f) an isothermal element arranged between said measuring element and said media-temperature measuring element; and
   g) a first recess in said silicon plate which extends up to said membrane layer, said first recess defining said first membrane; and
   h) a second recess in said silicon plate which extends up to said membrane layer, said second recess defining said second membrane,
   wherein said silicon plate has a thickness and wherein said isothermal element includes a silicon bar having a thickness equal to said thickness of said silicon plate, and wherein said silicon plate has a 100-surface such that, in each case, edges of said first and second recesses form a rectangle on said bottom side of said silicon plate, the edges the rectangles being situated, in each case, on a 111-surface of said silicon plate, said 111-surfaces forming an angle of approximately 54.7° with said 100-top surface of said silicon plate, and said two rectangles being situated such that their sides run parallel to one another.

6. The mass-flow sensor of claim 5 wherein said rectangles formed by the edges of said first and second recesses are squares.

7. A mass-flow sensor for measuring flow of a medium comprising:

a) a membrane;

b) a measuring element arranged on said membrane, past which the medium flows, said measuring element having a higher temperature than the medium and measuring an intensity of the flow of the medium based on transfer of heat into the medium;

c) a second membrane;

d) a media-temperature measuring element arranged on said second membrane, and measuring the temperature of the medium, at least one of the measurement of the medium flow being corrected and the temperature of the measuring element being altered depending on the temperature of the medium;

e) a frame of monocrystalline silicon in which said first and second membranes are suspended, wherein said first and second membranes and said frame are formed from a silicon plate having a membrane layer on a top side, and having at least one recess on a bottom side of said silicon plate which extends up to said membrane layer;

f) an isothermal element arranged between said measuring element and said media-temperature measuring element; and g) a first recess in said silicon plate which extends up to said membrane layer, said first recess defining said first membrane; and h) a second recess in said silicon plate which extends up to said membrane layer, said second recess defining said second membrane, wherein said silicon plate has a thickness and wherein said isothermal element includes a silicon bar having a thickness equal to said thickness of said silicon plate, and wherein said top surface of said silicon plate is a 100-surface, wherein, in each case, edges of said first and second recesses form a hexagon on an under side of said silicon plate, a first edge forms an angle of 90° with a second edge contiguous to it, said second edge forms an angle of 135° with a third edge contiguous to it, said third edge forms an angle of 135° with a fourth edge contiguous to it, said fourth edge forms an angle of 90° with a fifth edge contiguous to it, said fifth edge forms an angle of 135° with a sixth edge contiguous to it, said sixth edge forms an angle of 135° with said first edge contiguous to it, said first, second, fourth and fifth edges are each situated on a 111-surface of said silicon plate, said 111-crystal planes forming an angle of approximately 54.7° with said 100-top surface of the silicon plate, said third and the sixth edges are each situated on a 100-surface which runs perpendicular to said 100-top surface of said silicon plate, and said first and second recesses being situated such that said third and sixth edges of said first recess run parallel with said third and sixth edges of said second recess.

8. A mass-flow sensor for measuring flow of a medium comprising:

a) a membrane;

b) a measuring element arranged on said membrane, past which the medium flows, said measuring element having a higher temperature than the medium and measuring an intensity of the flow of the medium based on transfer of heat into the medium;

c) a second membrane;

d) a media-temperature measuring element arranged on said second membrane, and measuring the temperature of the medium, at least one of the measurement of the medium flow being corrected and the temperature of the measuring element being altered depending on the temperature of the medium;

e) a frame of monocrystalline silicon in which said first and second membranes are suspended, wherein said first and second membranes and said frame are formed from a silicon plate having a membrane layer on a top side, and having at least one recess on a bottom side of said silicon plate which extends up to said membrane layer;

f) an isothermal element arranged between said measuring element and said media-temperature measuring element; and g) a first recess in said silicon plate which extends up to said membrane layer, said first recess defining said first membrane; and h) a second recess in said silicon plate which extends up to said membrane layer, said second recess defining said second membrane, wherein said silicon plate has a thickness and wherein said isothermal element includes a silicon bar having a thickness equal to said thickness of said silicon plate, and wherein said top surface of said silicon plate is a 110-surface, edges of said first and second recesses each form a parallelogram on said bottom side of said silicon plate, a first edge forms an angle of approximately 109.5° with a second edge contiguous to it, said second edge forms an angle of approximately 70.5° with a third edge contiguous to it, said third edge forms an angle of approximately 109.5° with a fourth edge contiguous to it, said fourth edge forms an angle of approximately 70.5° with said first edge, said edges are each situated on a 111-surface of the silicon plate and run perpendicular to said 110-top surface of said silicon plate, and said first and second recesses being situated such that said edges of said first recess run parallel with said edges of said second recess.

9. The mass-flow sensor of claim 2 further comprising:

g) connection surfaces and printed conductors arranged on said silicon frame so as to create electrical contact between said measuring element and said media-temperature measuring element.

10. The mass-flow sensor of claim 9 wherein said measuring element and said media-temperature measuring element are arranged next to one another in the media flow, and wherein said connection surfaces for said measuring element and said media-temperature measuring element are arranged, relative to the media flow, on a same side of said silicon plate next to said measuring element.

11. The mass-flow sensor of claim 9 wherein said measuring element and said media-temperature measuring element are arranged next to one another in the media flow, and wherein said connection surfaces for said measuring element and said media-temperature measuring element are arranged, relative to the media flow, on a same side of said silicon plate next to said media temperature measuring element.

12. A mass-flow sensor for measuring flow of a medium comprising:
- a) a membrane;
- b) a measuring element arranged on said membrane, past which the medium flows, said measuring element having a higher temperature than the medium and measuring an intensity of the flow of the medium based on transfer of heat into the medium;
- c) a second membrane; and
- d) a media-temperature measuring element arranged on said second membrane, and measuring the temperature of the medium, at least one of the measurement of the medium flow is corrected and the temperature of the measuring element is altered depending on the temperature of the medium;
- e) a frame in which said first and second membranes are suspended; and
- f) an isothermal element arranged between said measuring element and said media-temperature measuring element, wherein said frame has a thickness and wherein said isothermal element includes a bar having a thickness less than said thickness of said frame.

* * * * *